Patented Feb. 3, 1925.

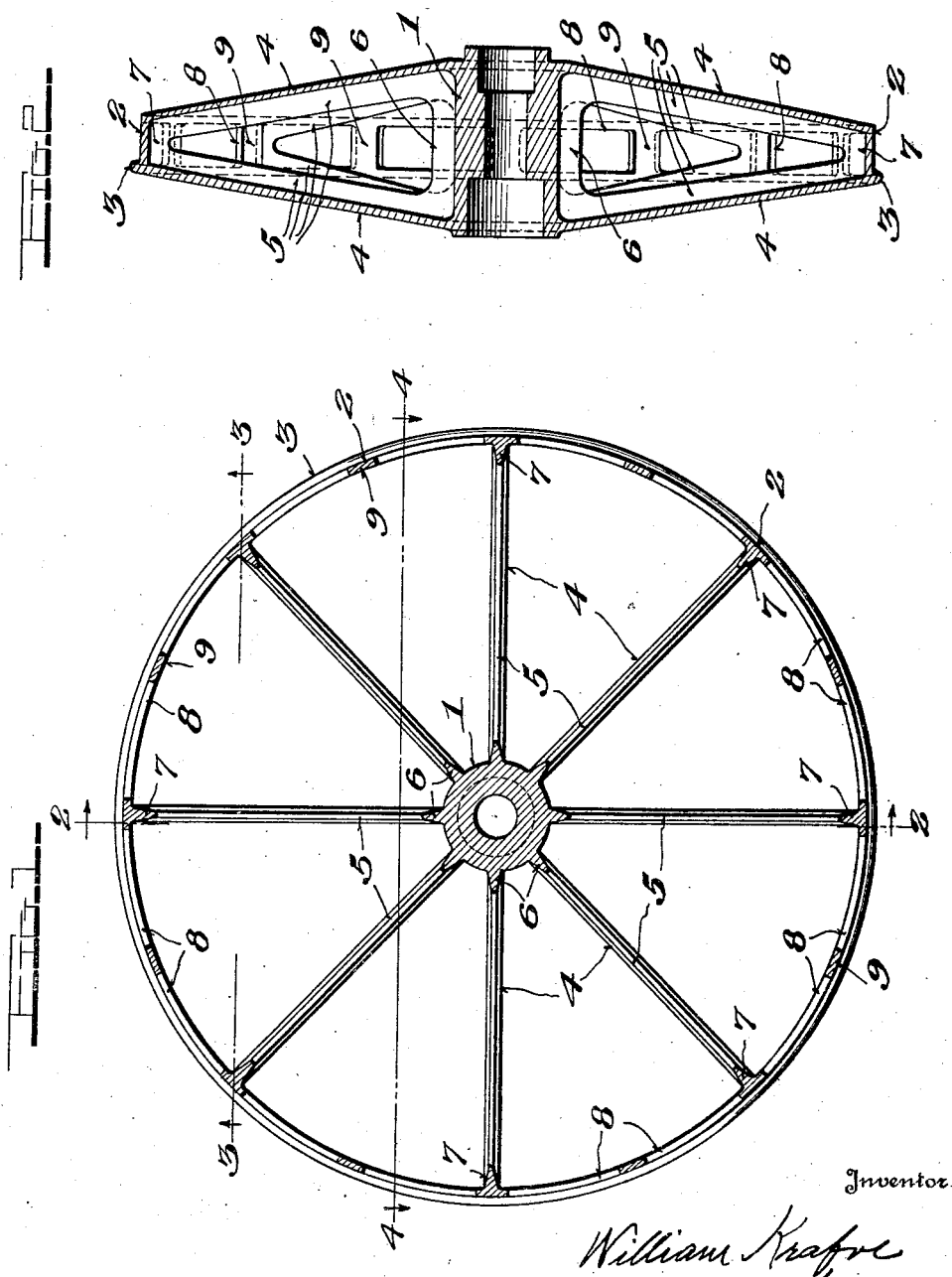

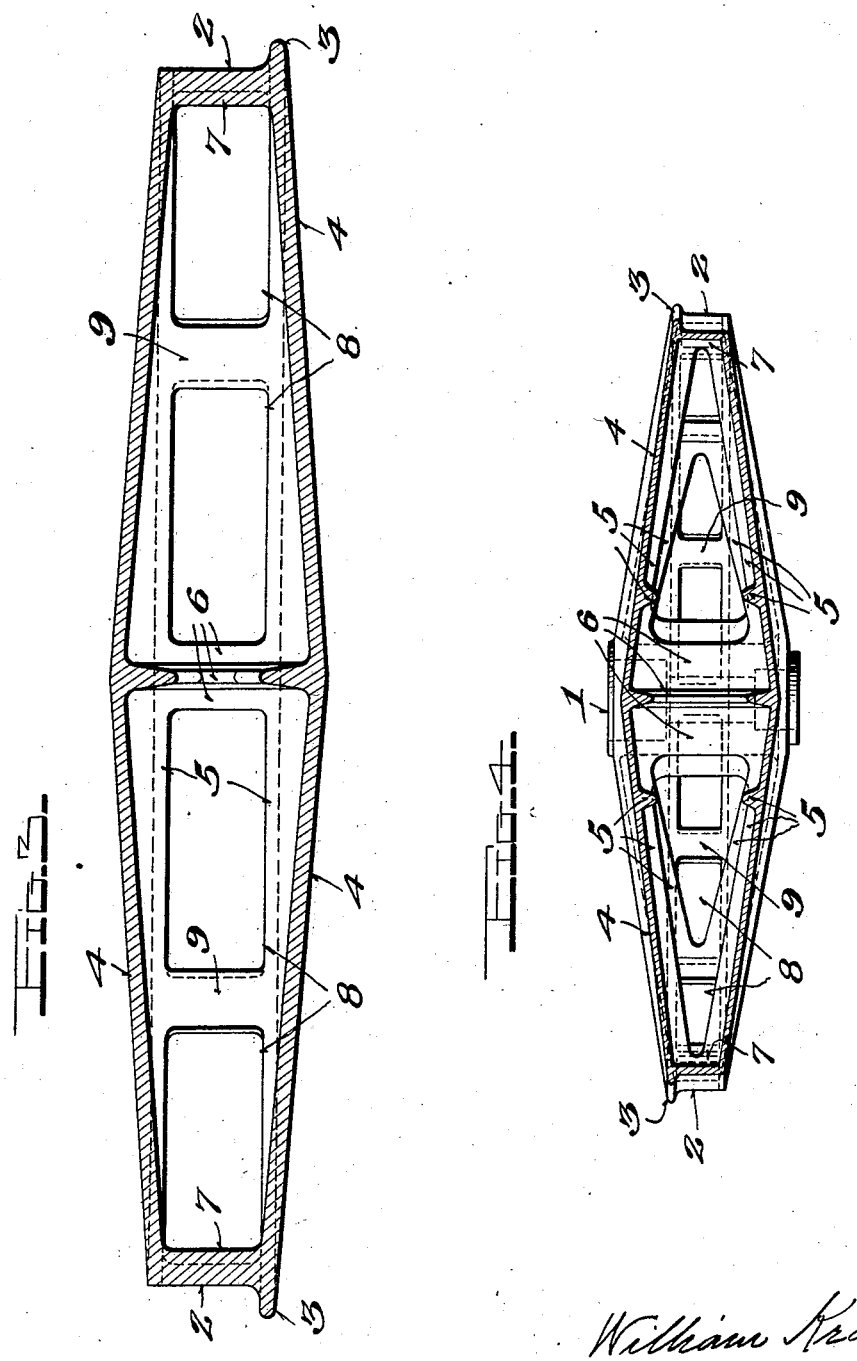

1,525,402

UNITED STATES PATENT OFFICE.

WILLIAM KRAFVE, OF OAKHAM, MASSACHUSETTS.

WHEEL.

Application filed December 11, 1923. Serial No. 679,929.

*To all whom it may concern:*

Be it known that I, WILLIAM KRAFVE, a citizen of the United States, residing at Oakham, in the county of Worcester and State of Massachusetts, have invented new and useful Improvements in Wheels, of which the following is a specification.

This invention relates to certain new and useful improvements in wheels and pertains more especially to wheels used in connection with automobiles.

The primary object of the invention is to provide a wheel which is made of a single casting of aluminum or aluminum composition or alloy and which is possessed of the required strength to withstand the usage to which wheels of this type are subjected.

A further object of the invention is to provide a wheel which has integral spokes therewith and to provide novel reinforcing means for the spokes.

A still further object of the invention is to provide a rim structure of open-formation, thereby not only decreasing the weight of the wheel, but also effecting economy of material and permitting production with less expense, and at the same time easier and quicker application and removal of the demountable rim.

In the drawings:—

Figure 1, is a central vertical sectional view;

Figure 2, is a section on line 2—2 of Figure 1;

Figure 3, is a section on line 3—3 of Figure 1, and

Figure 4, is a section on line 4—4 of Figure 1.

In proceeding in accordance with the present invention, the entire structure, which may be made of aluminum or an aluminum alloy or composition, is formed in a single casting and has a hub 1, spokes 4 and a rim 2, the latter formed with the usual circular peripheral flange 3 to engage the demountable rim (not shown).

The spokes 4 are arranged in pairs, and extend from the hub 1, in convergent relation to the rim 2, into which latter they merge as shown in Figure 2 of the drawings. Each spoke is reinforced or strengthened by a central and right-angular rib 5, the ribs having a convergent relation, corresponding to that between the spokes and being connected by lateral ribs 6 and 7 which latter merge into the hub, and rim 2, respectively. As depicted in Figure 1, of the drawings the ribs 6, which laterally connect the ribs 5, extend axially of the hub 1, and radially thereof, contributing to strengthening and reinforcing of the hub, in an obvious manner. Likewise the ribs 7, which laterally connect the outer ends of the ribs 5, function to strengthen the rim and to reinforce the latter.

As depicted more clearly in Figure 1, of the drawings, the rim 2 is of open formation and is constructed with a series of openings 8, with resultant lateral connections 9.

The convergent spokes, braced by the ribs 5, 6 and 7 act to effectually support the rim 2 against any collapsing tendency. The cross-connections 9 of the rim occur preferably at points central of the space between the alined pairs of spokes.

The openings 8 are preferably of rectangular outline or shape, and are arranged so that a pair of same occur between adjacent spokes.

From the foregoing it will be apparent, that the several ribs mutually brace and strengthen each other and that a strong and substantial structure of wheel is afforded, while still preserving an open-formation as to the entire wheel, so as to render same light in weight, and of attractive appearance, and at the same time to permit of economical production.

Having thus described my invention, what I claim as new and desire to secure by Letters Patent is:—

1. In a cast wheel of the type described, a hub, a rim, spokes arranged in pairs and extending from the hub ends toward the rim in convergent relation and merging into the rim, right angular ribs extending lengthwise of the spokes and on the inner faces thereof, and lateral ribs connecting the inner and outer ends of the lengthwise ribs and merging into the hub and rim respectively and extending radially of the hub and axially thereof, said rim being formed with openings between the adjacent pairs of spokes.

2. In a cast wheel, a hub, a rim of open formation having a peripheral demountable rim engaging flange on one side thereof, and spokes connecting the rim and hub.

3. In a cast wheel, a hub, a rim of open formation having a peripheral demountable rim engaging flange on one side thereof, and a series of pairs of spokes connected at their inner ends to the hub and at their outer ends to the rim.

4. In a cast wheel, a hub, a rim, a series of pairs of spokes connected at their inner ends to the hub and at their outer ends to the rim, and continuous ribs extending along the hub, along the inner faces of the spokes and across the inner circumference of the rim.

5. A wheel, composed of a single casting having a hub, a rim, spaced opposed registering spokes arranged in pairs and connecting the hub and rim, and continuous ribs for each pair of spokes extending along the hub, along the inner faces of the spokes, and across the rim.

In testimony whereof I have signed my name to this specification in the presence of two subscribing witnesses.

WILLIAM KRAFVE.

Witnesses:
W. ARTHUR GARRETY,
VICTORIA R. BOJANOWSHA.